March 31, 1964 P. P. BIRINGER ETAL 3,127,547
INFINITE SPEED RATIO STATIONARY CONTROL SYSTEM
FOR INDUCTION TYPE MOTORS
Filed May 31, 1960 9 Sheets-Sheet 1

*Inventors*
*P. P. BIRINGER*
*G. R. SLEMON*
by: *Cavanagh & Norman*

EQUIVALENT CIRCUIT
OF MOTOR

ROTOR NETWORK

March 31, 1964 P. P. BIRINGER ETAL 3,127,547
INFINITE SPEED RATIO STATIONARY CONTROL SYSTEM
FOR INDUCTION TYPE MOTORS
Filed May 31, 1960 9 Sheets-Sheet 5

Inventors
P. P. BIRINGER
G. R. SLEMON
by: *Cavanagh & Norman*

Inventors
P. P. BIRINGER
G. R. SLEMON
by: Cavanagh & Norman

Inventors
P. P. BIRINGER
G. R. SLEMON
by: *Cavanagh & Norman*

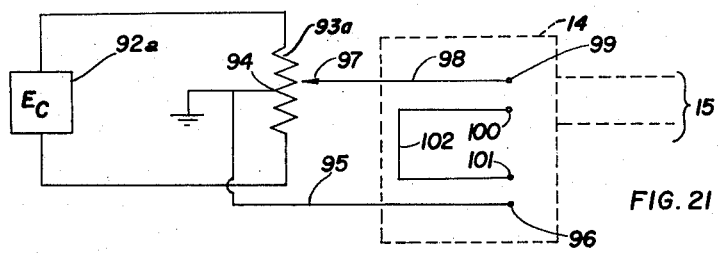
FIG. 21
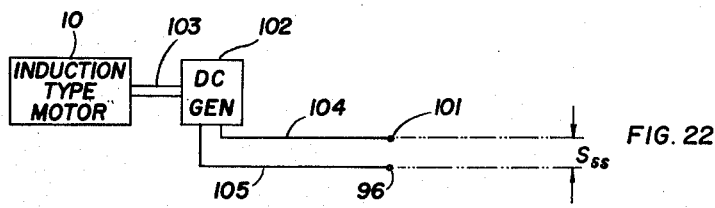
FIG. 22
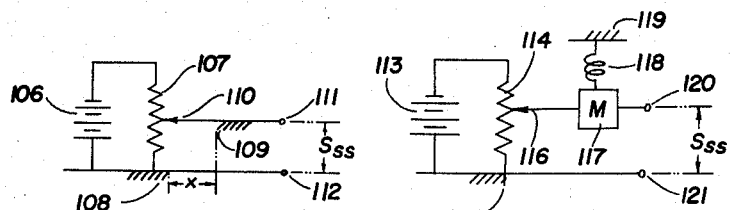
FIG. 23
FIG. 24
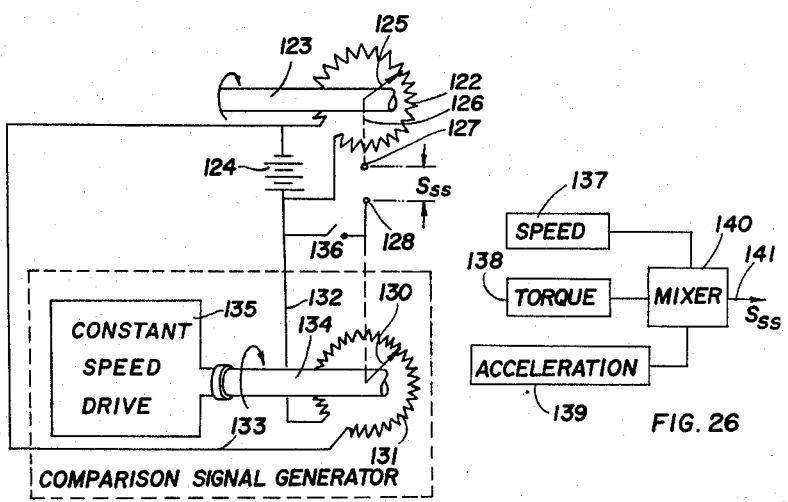
FIG. 25
FIG. 26

_United States Patent Office_

3,127,547
Patented Mar. 31, 1964

3,127,547
INFINITE SPEED RATIO STATIONARY CONTROL SYSTEM FOR INDUCTION TYPE MOTORS
Paul Peter Biringer, 6 Lumley Ave., Toronto 17, Ontario, Canada, and Gordon Richard Slemon, 40 Chatfield Drive, Don Mills, Ontario, Canada
Filed May 31, 1960, Ser. No. 32,971
11 Claims. (Cl. 318—229)

This invention relates to an infinite speed ratio stationary control system for induction type motors.

Known systems for the control of speed torque and position of the rotor of electric motors are characterized by the placing of a regenerative circuit motor-generator complex between the source of electrical power and the electric motor being driven.

It is the main object of this invention to provide a power modulating control system for alternating current electric motors, characterized by non-rotating, i.e. stationary apparatus between the source and the motor being driven to enable wide ranges of speed selection and close control of a selected speed under varying load conditions and varying conditions in the supply power.

It is an object of the invention to provide a control system permitting the controlled motor to be relatively independent of load torque (within predetermined limits) at any predetermined speed setting in the forward and reverse direction of rotation.

It is a further object of the invention to provide a control system whereby the torque applied can be reversibly controlled to a preset value independent of the speed of the motor (within the rated limits of the motor).

It is further among the objects of the invention to provide a control system having rapid response to changes in speed or torque setting.

It is further among the objects of this invention to provide a control system for induction type motors in which reversal of speed control of the motor may be accomplished by a compatible method of phase sequence reversal by virtue of the operation of a polyphase power modulator between the energizing source and the motor in which the modulator is characterized by a variable polyphase output.

These and other further objects and advantages of the invention will be apparent from a consideration of the following description and the drawings in which:

FIGURE 21 is a diagrammatic illustration of a preferred form of control current source and comparator embodying voltage adjustment and reversal features for control of speed and speed reversal according to the invention.

FIGURE 22 is a diagrammatic illustration of an induction type motor rotor and direct current signal generator of the tachometer type associated therewith for a generating a shaft state signal responsive to shaft motion of the motor being controlled according to the invention.

FIGURE 23 is a diagrammatic illustration of a torque measuring device adapted to generate a shaft state signal $S_{ss}$.

FIGURE 24 is a diagrammatic illustration of means for developing a shaft state signal $S_{ss}$ responsive to acceleration of the shaft.

FIGURE 25 is a further diagrammatic illustration of means for developing a shaft position shaft state signal $S_{ss}$.

FIGURE 26 illustrates the combining of the shaft state signals from speed, torque and acceleration responsive devices to provide a combined signal $S_{ss}$ adapted to control the induction motor through the power modulator described herein responsive to each of these shaft states.

Figure 1:
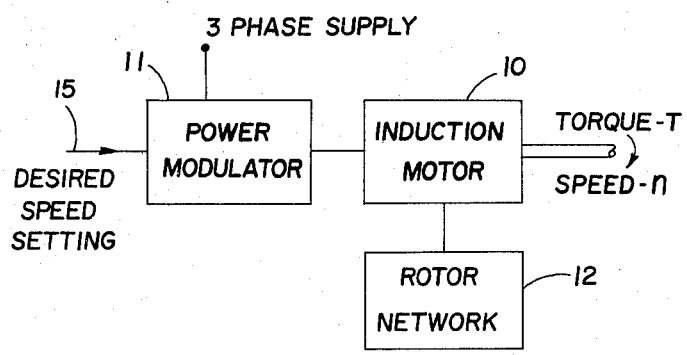
FIGURE 1 shows a block diagram of an open-loop system of the invention providing for motor speed control.

Referring now to the drawings as shown in FIGURE 1. A schematic block diagram showing a typical intallation in which the invention might most generally be used. In order to control induction motor 10 so as to provide a constant controlled speed output, the power supply is fed to motor 10 through power modulator 11. The motor 10 is additionally provided with a rotor network 12, the operation of which, in conjunction with motor 10, together with power modulator 11, control the torque of the motor which will be explained in detail hereafter.

Figure 2:
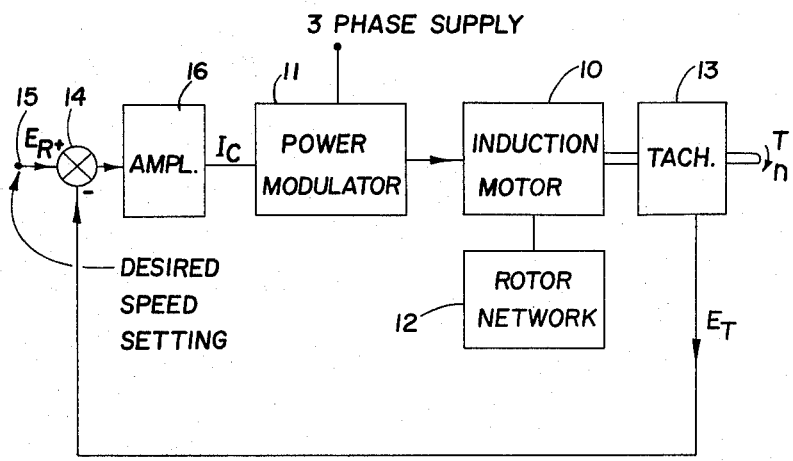
FIGURE 2 shows a block diagram of a closed-loop control system of the invention providing for motor speed control.

FIGURE 2 shows a further embodiment of the basic application of the invention in which the speed of the motor in either direction may be accurately controlled by means of a closed-loop circuit. In this application, a tachometer 13 is connected to motor 10. Tachometer 13 is designed to give a signal proportional to the speed and with a polarity which corresponds to the direction of rotation of motor 10. This signal is compared with a signal representing the desired speed by means of comparator 14. The signal corresponding to or representing the desired speed is fed from an external source 15. The difference between the signals $E_R$ (representing the external signal) and the signal $E_T$ from the tachometer 13, is fed to amplifier 16. The amplified signal $I_c$ is then fed to the power modulator 11 as a controlled current, the purpose of which will become apparent hereafter. The construction of tachometer generator 13, comparator 14 and amplifier 16 do not form a part of the invention and they may be of any suitable known type.

Figure 3:
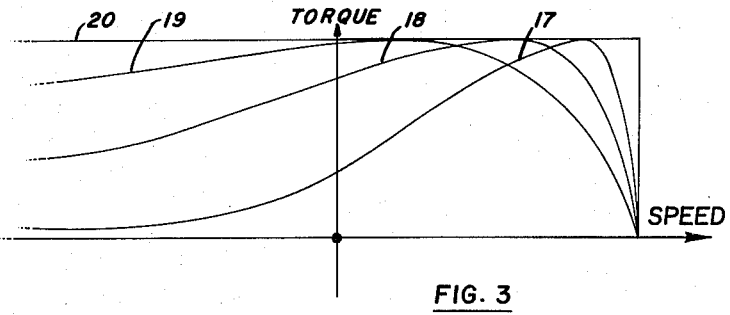
FIGURE 3 shows the idealized torque-speed characteristics for a motor compared with other torque speed curves.

Before proceeding with a description of the rotor network and the power modulator, reference is made to FIGURE 3 in which there is shown a series of speed torque curves such as are normally available. Curve 17 represents a typical speed torque curve of an induction motor which is unregulated. Curves 18 and 19 illustrate the effects of placing additional resistances in the rotor circuit. Curve 20 illustrates the theoretically ideal speed torque curve for use in industrial application of a system such as that shown in FIGURE 2. The virtue of the torque speed curve 20 lies in the fact that a torque is virtually independent of the speed of the motor for any given input. It will be shown that a speed torque curve approximating that of curve 20 may be obtained by use of the power modulator 11 and rotor network 12 of the invention.

In order to control the level of the horizontal portion of curve 20, i.e. the level of torque, it is necessary to control the input current to the motor 10. In this way a series of curves similar in form to curve 20 could be produced.

Figure 4:
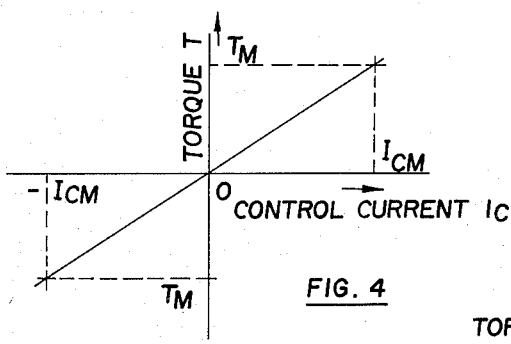
FIGURE 4 shows the idealized relationship between the output torque of the induction motor and the control current supplied to the power modulator.

The control of the current input to the motor 10 is effected by means of power modulator 11, to be described in detail hereafter. The input current to the motor 10 is controlled by means of power modulator 11 which is designed to supply an input current to the motor proportional to the control current $I_c$ to the power modulator 11. Thus, referring to FIGURE 4, there is shown an ideal curve of control current against torque. It will be noted that torque reversal occurs upon the reversal of the control current.

Figure 5:
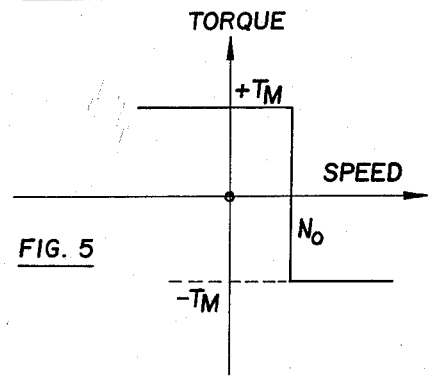
FIGURE 5 shows the idealized torque speed characteristics of the closed-loop system shown in FIGURE 2.

Thus, referring again to FIGURE 2, it will be seen that if a predetermined speed $N_0$ has been selected as represented by the signal $E_R$ a predetermined control current will be fed to the power modulator, thus regulating the supply to the motor 10. Upon an increase or decrease of load, the variation in speed will be sensed by the tachometer 13 causing a variation in the signal $E_T$. The difference between the signal $E_T$ and $E_R$ is fed to the amplifier 16 and in turn is fed to the power modulator as a control current to produce the required addition or decrease of power input to the motor 10. This will effect a change in the output torque to maintain the motor at the required speed setting. It will be appreciated that only a small difference between the signals $E_R$ and $E_T$ will be required to provide the control current to the power modulator to provide the torque required by the load. Thus, as the load torque varries, the speed remains essentially constant at the setting $N_0$ as shown in FIGURE 5. If the control current $I_c$ is limited to some maximum value $I_{cm}$ in either direction then the maximum torque $T_m$ which can be supplied to the load is also limited as shown in FIGURE 5. This provides a controllable safety feature.

Figure 6:
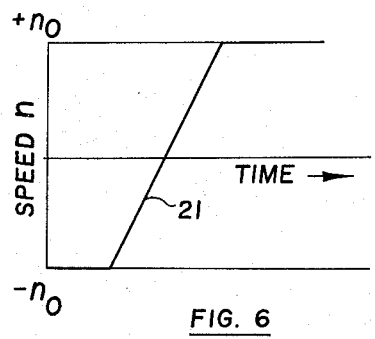
FIGURE 6 shows the idealized relationship between speed and time after a change in the speed setting of the input of the system shown in FIGURE 2.

Referring now to FIGURE 6, there is shown the theoretically ideal time response of the system to a change in desired speed setting. Upon varying the speed setting by changing the signal $E_R$ a large difference will occur between $E_R$ and $E_T$. Thus the maximum torque available to overcome the inertia in acceleration or deceleration will be supplied until such time as the speed approaches closely to the new desired speed. Thus the portion 21 of the speed time curve of FIGURE 6 will theoretically aproximate a straight line.

It will be appreciated that the above discussion has been concerned with the ideal theoretical approach to the control of the motor and that in practice, only approximations to the curves shown will be obtainable.

Figure 7:
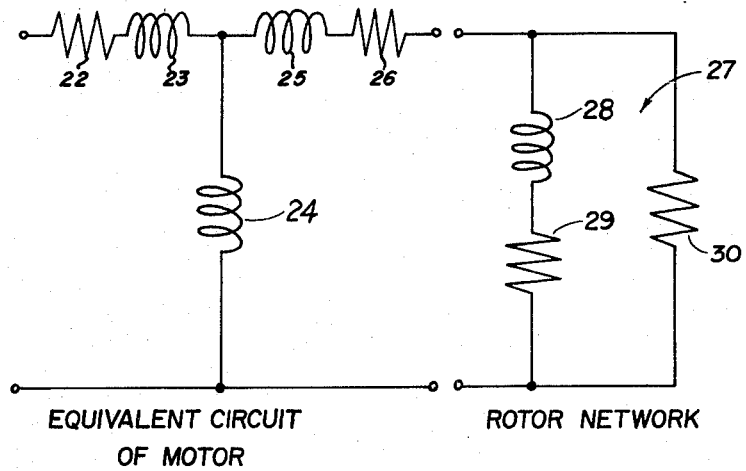
FIGURE 7 shows the equivalent circuit of a typical induction motor together with the equivalent circuit of a rotor network of the invention.

In order to obtain a speed torque curve approximating to curve 20 in FIGURE 3, it is impractical to provide a variable resistance in the rotor circuit since such a variability of resistance would produce only a series of curves such as curves 18 and 19 shown in FIGURE 3. Such a torque speed curve can be approximated with squirrel cage type induction motors. However, with induction motors utilizing a rotor network, it has been found that an additional rotor network of the type shown in FIGURE 7 can be designed to produce a close approximation to the torque sped curve 20 of FIGURE 3. FIGURE 7 shows a normal single-phase equivalent circuit for a polyphase induction motor in which stator resistance and leakage inductance are represented by resistance 22 and reactance 23 respectively. The magnetizing inductance is designated 24 and the rotor leakage reactance and rotor resistance both referred to the stator frequency are shown as reactance 25 and resistance 26 respectively. The additional rotor network 27 consists of two parallel branches in each phase of the rotor circuit of the motor 10. The first branch of the rotor network consists of the linear inductor 28 which is in the form of a nonsaturable coil, and linear resistance 29, connected in series. The second branch of the network is provided with linear resistance 30 connected in parallel with the first branch of the network. The choice of the magnitude of these components is of importance in determining the resultant shape of the torque speed curve produced. It should be appreciated that when the motor speed is going through a variation from full speed in a forward direction up to full speed in a backward direction, the rotor frequency is changing from approximately zero to twice the supply frequency of the motor. To achieve the constant torque effect the components of the rotor network must be chosen so that the effective resistance of the rotor network when reflected into the stator circuit at stator frequency, remains essentially constant as the frequency in the rotor circuit of the motor is varied by a variation of the motor speed.

At low rotor frequency the first branch of the rotor network which is composed of inductor 28 and resistor 29, will dominate the behaviour of the circuit. As the rotor frequency increases, the increased reactance of inductor 28 will cause the second branch of the rotor network containing resistance 30 to dominate the behaviour of rotor circuit.

It will be appreciated that the exact values of the inductors 28 and resistors 29 and 30 will vary depending on the type of motor with particular reference to the values of reactance 25 and resistance 26 and can thus be deduced by any standard method of network synthesis. It will also be appreciated that variations and refinements may be made to the rotor network of FIGURE 7 in order either to approach more closely to ideal conditions or to achieve other described torque speed characteristics which may be desirable in any particular application (e.g. in the open-loop speed control of FIGURE 1, it might be desirable to have a torque which varies linearly with speed).

As previously explained, given the torque speed characteristics just described, it is necessary in order to provide an effective control for the system that will result in an approximation to the type of curves shown in FIGURES 5 and 6, to provide a power modulator capable of controlling the input to the motor 10. It is particularly convenient that the power modulator should be controlled by a current which is a variable direct current. It is also convenient for industrial application that the power modulator should produce a standard balanced polyphase output from a polyphase input particularly the standard three-phase input currently in use.

Since torque reversal of polyphase induction motor can be effected only by phase reversal of the power supply to the motor, it is important that the power modulator be designed to provide reversal of the phase sequence upon reversal of its control current. The importance of this feature can be seen by reference to FIGURE 4. Because of the somewhat complex nature of the power modulator, it is considered desirable to review its operation from basic principles. Reference is, therefore, first made to FIGURE 8 in which there is shown a single phase frequency doubler.

This doubler is composed of two cores, 31 and 32, each of which contains three windings. Windings 33 and 34 are primary windings and windings 35 and 36 are the secondary windings and windings 37 and 38 are the control windings for the circuit. Primary windings 33 and 34 are connected in series with similar polarity and terminals 39 and 40 are connected to the alternating current input source. Secondary windings 35 and 36 are connected in series with opposite polarity and are connected to secondary or output terminals 41 and 42. Control windings 37 and 38 are connected in series with opposite polarity between control current terminals 43 and 44. The properties of this system are as follows. If the control current is zero then the secondary or output voltage is also zero although the primary terminals 39 and 40 are connected to the alternating current source. The secondary voltage or output current will, by virtue of the opposed polarity of windings 35 and 36, contain only even harmonics of the primary frequency and will be a function of the current in windings 37 and 38. An increase in the control current will result in an increase in output voltage and current up to a predetermined limit. It is important to know that when the direction of the control current $I_c$ is reversed, the output voltage which is an alternating voltage composed of all the even harmonics of the primary input voltage, will reverse its polarity.

Figure 8:
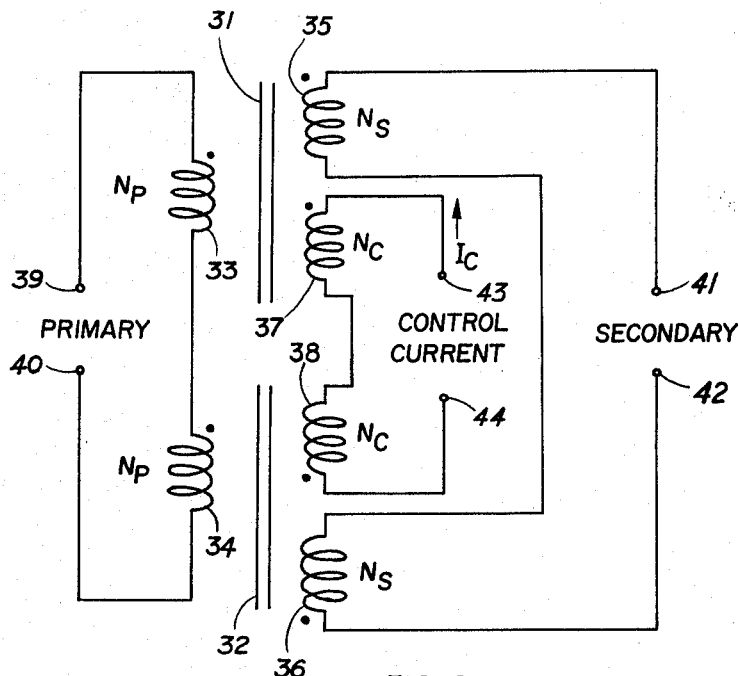
FIGURE 8 shows the circuit connection for an elementary multiplier.
Figure 9:
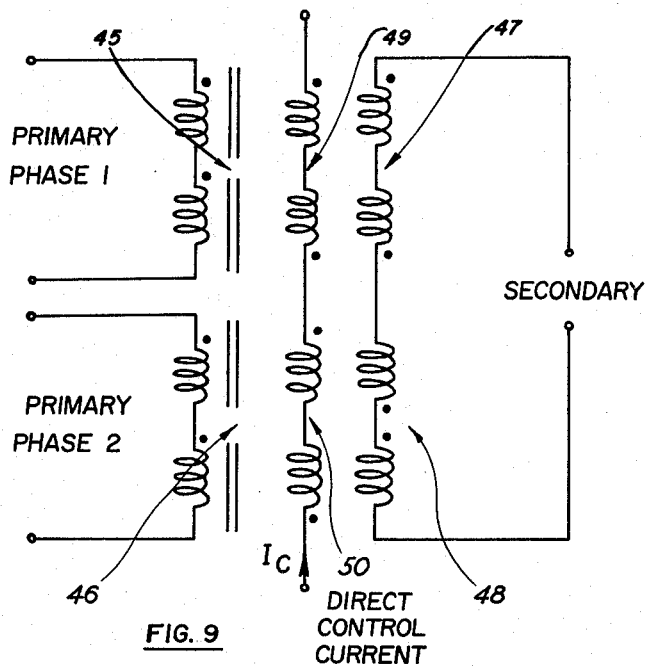
FIGURE 9 shows a circuit diagram for a power modulator leaving two input portions and a single-phase output.

Referring now to FIGURE 9. There are shown two frequency doublers 45 and 46 of the same type and connections as shown in FIGURE 8. These doublers are connected to two different supplies with a 90° phase difference between them. The secondaries 47 and 48 of the doublers 45 and 46 are connected in series in opposition (that is to say with the polarity of both coils of secondary 48 reversed with respect to secondary 47; this may be seen from an examination of the polarity of the coils which is shown in each in the conventional manner in the drawings). The control current windings 49 and 50 are connected in series aiding. This form of winding connection is designed to effect filtering of certain harmonics in the secondary and control windings. Thus as the primary sources have a 90° phase difference, the second-harmonic components in the secondary and control windings will have a 180° phase difference in doublers 45 and 46. Since the secondary windings 47 and 48 are connected in series in opposition, their second-harmonic voltages will be added whilst by virtue of the connection of the control circuit in series aiding, the second-harmonic voltages will cancel.

It will be seen that the fourth-harmonic component will be present in the control winding but will cancel in the secondary windings. Thus, it will be seen that the control winding will contain only the fourth-harmonic and multiples thereof whilst the secondary circuit will contain only the remaining even harmonics. Therefore, by using this type of connection, it is possible to achieve an output waveform which is closer to a sinusoidal form. The absence of the second harmonic in the control circuit eliminates the necessity for additional reactors which would otherwise be required.

Figure 10:
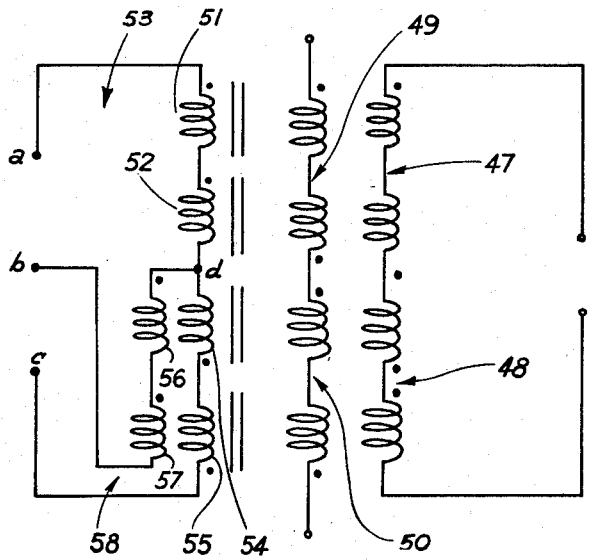
FIGURE 10 shows a circuit diagram for a power modulator having a three phase input and a dual-phase output.
Figure 11:
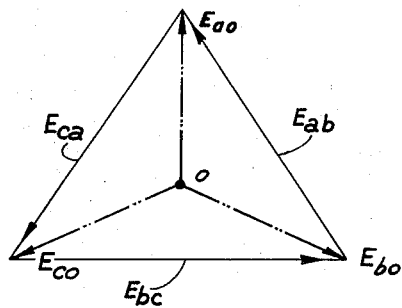
FIGURE 11 shows a vector diagram of the output of a modulator of FIGURE 10.

Referring now to FIGURE 10. There is shown the wiring diagram for a doubler of the type shown in FIGURE 9 but adapted for a three-phase input of the type which would be encountered in normal industrial usage. The connections of the control circuit 49 and 50 and secondaries 47 and 48 are similar to that previously described. The primary is provided with a single set of windings 51 and 52 on doubler 53 and two sets of windings 54, 55 and 56, 57 on doubler 58. For the sake of simplicity of description, the primary supply terminals are indicated as $a$, $b$, $c$. The windings 54, 55 and 56, 57 are wound with an equal number of turns N. The supply voltage is represented by vectors $E_{ab}$, $E_{bc}$, $E_{ca}$ of FIGURE 11. These line to line voltages may also be represented by the set of line to neutral voltages $E_{ao}$, $E_{bo}$, $E_{co}$ (shown in phantom).

Figure 12:
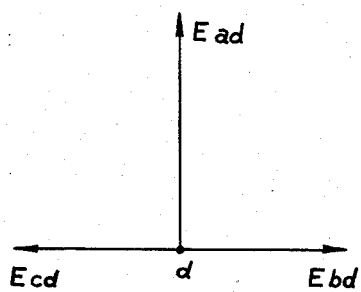
FIGURE 12 shows a modified vector diagram of the same output.

Referring now to FIGURE 12, it will be seen that with the polarity of the windings 54, 55, and 56, 57 as shown in FIGURE 10, the voltages $E_{bd}$ and $E_{cd}$ will be equal and opposite. In order that the total line voltages will be those shown in FIGURE 11, it will be seen that the voltage $E_{ad}$ of FIGURE 12 must have a magnitude of $\sqrt{3}$ times that of $E_{bd}$ or $E_{cd}$ and must be phase shifted by 90° with respect to $E_{bd}$ or $E_{cd}$. Thus the windings 51 and 52 are each provided with $\sqrt{3}$ N turns.

Thus it can be seen from FIGURE 12 that as voltage $E_{ad}$ and $E_{bd}$, $E_{cd}$ are phase-shifted by 90° the operation of the doubler shown in FIGURE 10 will be basically similar to the operation of the doubler shown in FIGURE 9 and as previously described, the polarity of the secondary output voltage will be a function of the direction of the current in the control circuit. Thus a reversal of the control current will effect a 180° phase-shift in the output voltage.

Figure 13:
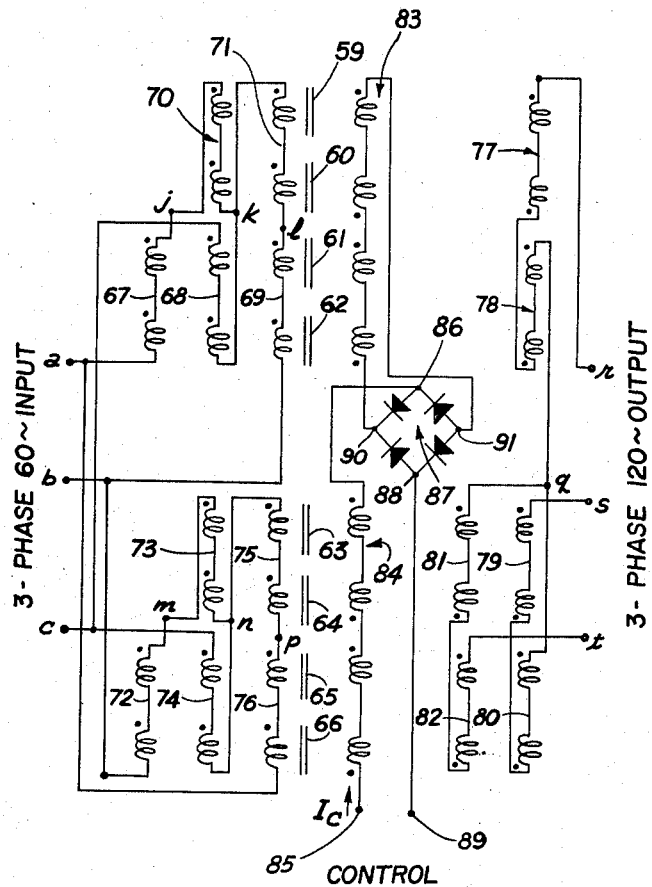
FIGURE 13 shows a power modulator with a three-phase input and a three-phase output capable of phase sequence reversal in the output.

Referring now to FIGURE 13. There is shown a wiring diagram of a multiplier as contemplated by the invention for use with a three-phase input and producing a three-phase output and having provision for phase reversal of phase sequence of the output. In considering FIGURE 13, it will be noted that the multiplier may be broken down into two multipliers of the general type illustrated in FIGURE 10, each of which is provided with pairs of cores 59, 60; 61, 62; and 63, 64; 65, 66. In order to provide a three-phase output, use is made of the single phase output in each of the groups of cores 59, 60; 61, 62 and 63, 64; 65, 66; these outputs being arranged to be at 90° phase difference from each other at second harmonic frequency. In order to produce the secondary outputs from each of the said groups of cores at 90° phase difference, it is necessary that the primaries should be at 45° phase difference between the respective groups of cores at supply frequency. It will be noted in the primary windings that the windings for each of the core groups 59—62 and 63—66 are connected to the input terminals $a$, $b$ and $c$. The number of turns and the polarity for each core group are arranged so as to provide a 45° phase shift with respect to the other group. In order to appreciate the interconnection more clearly, reference is now made to FIGURES 14 and 15.

Figure 14:
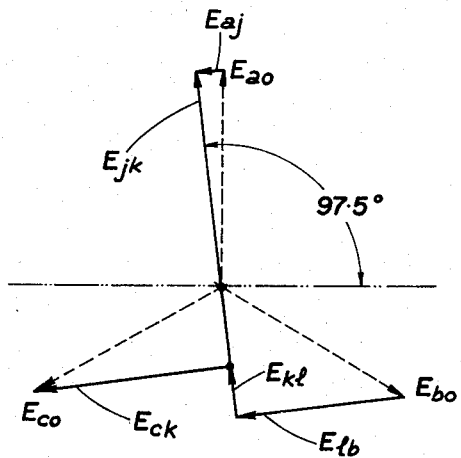
FIGURE 14 shows a vector diagram of the input voltages of one branch of the modulator of FIGURE 13.

In FIGURE 14, the vectors $E_{ao}$, $E_{bo}$ and $E_{co}$ represent the primary phase to neutral input voltages at 120° phase difference. FIGURE 14 shows how these supply voltages can be composed from vectors which are at right angles to each other, one set of these vectors being disposed at 7.5° from the horizontal and the other set being disposed at 97.5° from the horizontal. The set of voltages at 7.5° from the horizontal are induced in the windings 67, 68 and 69 of cores 61 and 62 and the set of voltages at 97.5° are induced in the windings 70 and 71 of the cores 59 and 60.

Starting from point "$a$" on FIGURE 13, a voltage $E_{aj}$ induced in windings 67 has added to it a voltage $E_{jk}$ induced in windings 70. From point "$k$" a further voltage $E_{ck}$ induced in windings 68 is added thus establishing the phase to phase voltage $E_{ca}$ of the supply.

Again starting from point "$k$" the addition of voltages $E_{kl}$ induced in windings 71 and $E_{lb}$ induced in windings 69 establishes the phase to phase voltage $E_{ab}$ of the supply.

Figure 15:
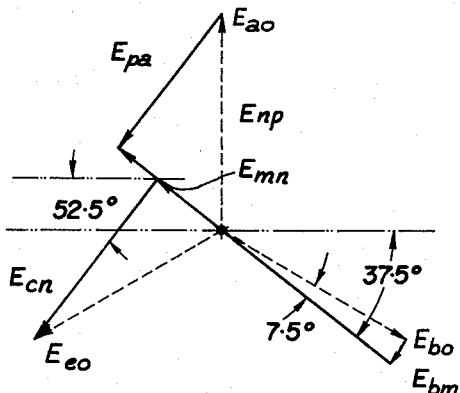
FIGURE 15 shows a vector diagram of the other branch of the modulator of FIGURE 13.

Similarly FIGURE 15 represents the vector diagram illustrating the voltages induced in the windings of cores 63—66. The voltages induced in the windings of core block 63—66 are required to be at 45° phase-shift with respect to the voltages in core group 59—62. As shown in FIGURE 15, this is accomplished by resolving the input voltages into components at 37.5° and 52.5° measured from the horizontal. By comparing FIGURES 14 and 15, it will be seen that the components in FIGURE 15 have a similar mirrored symmetry to those of FIGURE 14 but displaced by 135°. Thus the two sets of resolved vectors in FIGURE 14 will be seen to be mutually displaced 45° with respect to the two sets of resolved vectors in FIGURE 15.

Referring now to FIGURES 13 and 15, starting from point "b" a voltage $E_{bm}$ induced in windings 72 of cores 65 and 66 has added to it a voltage $E_{mn}$ induced in windings 73 of cores 63 and 64. From point "n" a further voltage $E_{cn}$ induced in windings 74 is added thus establishing the phase to phase voltage $B_{bc}$ of the supply.

Again starting at point "n" the addition of voltages $E_{np}$ induced in windings 75 and $E_{pa}$ induced in windings 76 establishes the phase to phase voltage $E_{ab}$.

It will be appreciated that a 45° phase-displacement could also be achieved by utilizing a 22.5° forward displacement (or resolution) of the primary voltages for one group of cores together with a 22.5° displacement in the opposite direction of the resolved primary voltages for the other group of cores. However, it will be appreciated by those skilled in the art that such an arrangement would have resulted in the necessity for additional numbers of turns in the primary coils, with a concomitant power loss which, therefore, renders the arrangement less desirable than the arrangement indicated by FIGURES 14 and 15.

Since the voltages induced in the primary windings in the two groups of cores are phase-shifted by 45° the second-harmonic voltages induced in the secondary windings of the two groups of cores will be at 90° phase displacement.

Figure 16:
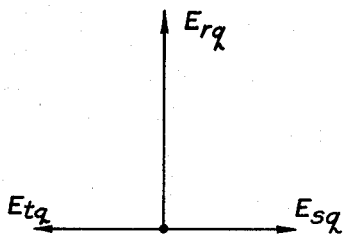
FIGURE 16 shows a vector diagram of the output voltages induced in the power modulator of FIGURE 13.

The secondary voltages are vectorially represented in FIGURE 16, the voltage $E_{rq}$ being induced in windings 77 and 78 of cores 59—62; the voltage $E_{sq}$ is induced in windings 79 and 80 of cores 63—66, and the voltage $E_{rq}$ is induced in windings 81 and 82 of cores 63—66. The number of turns and the polarities of the windings on these two groups of cores are so chosen that the output voltages at terminals $r$, $s$ and $t$ form a balanced three-phase set.

The control windings 83 for cores 59, 60 and 61, 62 are connected in series as are the control windings 84 for cores 63—66. (This connection is identical to that described with relation to FIGURES 9 and 10.) The control windings 84 are connected at one end to control terminal 85 and at the other end to terminal 86 of bridge rectifier 87. The opposite terminal 88 of bridge rectifier 87 is connected to the other control terminal 89. The ends of control windings 83 are connected to terminals 90 and 91 of rectifier bridge 87. Thus it can be seen that when the control current $I_c$ flows in the direction shown by the arrow in FIGURE 13, the current is passed in series through both sets of control windings 83 and 84. However, when the control current $I_c$ is reversed, it will be seen that the reversal occurs only in control windings 84 by virtue of rectifier bridge 87. It will be recalled that, as explained with regard to FIGURE 9, a reversal of the control current effects a reversal of the polarity of the second-harmonic voltage. In the case of FIGURE 13, the reversal of control current occurs only with regard to group of cores 63—66 which, it will be recalled, induces secondary voltages $E_{tq}$ and $E_{sq}$ (see FIGURE 16). Thus upon reversal of the control current, the vectors $E_{tq}$ and $E_{sq}$ will be interchanged while the voltage $E_{rq}$ remains unchanged. This produces reversal of the phase sequence from $rst$ to $rts$. In this way, it will be seen that it is possible to produce a reversal of the phase sequence in the balanced three-phase output as the control current reverses.

As explained with regard to FIGURE 8, the magnitude of the current in the control windings at any given time, will control the voltage and current in the output. Thus it is possible with the system shown in FIGURE 13 to produce a variable reversible balanced three-phase power output controlled merely be the current and its direction of flow in the control windings. It will be appreciated that it would be possible to supply the control current for the two groups of control windings from the two separate sources, one of which is reversible while the other is not.

It will thus be seen that the power modulator of FIGURE 13 is capable of varying the power output from a given power input proportionally to the control current, and in addition, the phase sequence of the balanced polyphase output is capable of being instantaneously reversed as the control current is reversed.

Thus the power modulator 11 is capable of introduction into the systems described in order to provide a stepless control continuously operable over the whole operating range of the motor for either direction of rotation.

Figure 17:
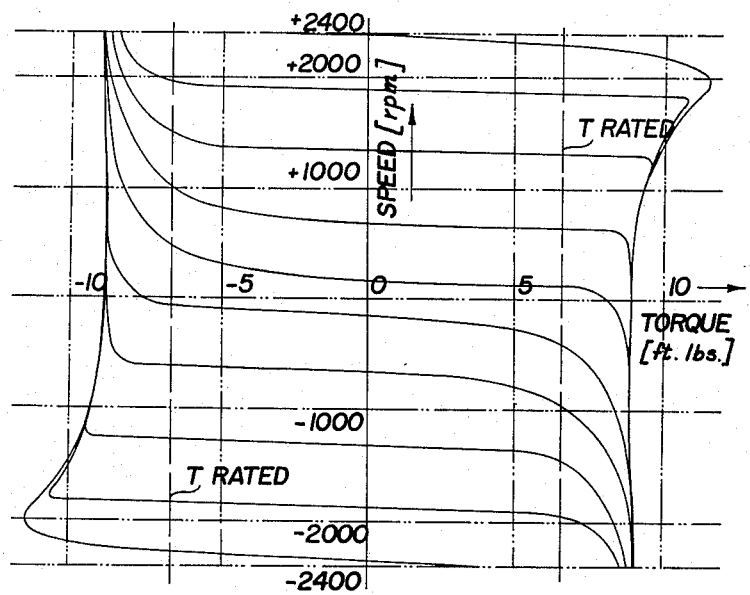
FIGURE 17 shows a typical measured torque speed characteristic of a system of the closed-loop circuit of FIGURE 2.

FIGURE 17 illustrates a typical torque speed curve obtained in actual tests with a standard 1.5 horsepower 60 cycle wound-rotor induction motor supplied by a power modulator of the form shown in FIGURE 13 and provided with a rotor network of the type described with relation to FIGURE 7 and the whole connected in the form of the system shown in the block diagram of FIGURE 2.

Figure 18:
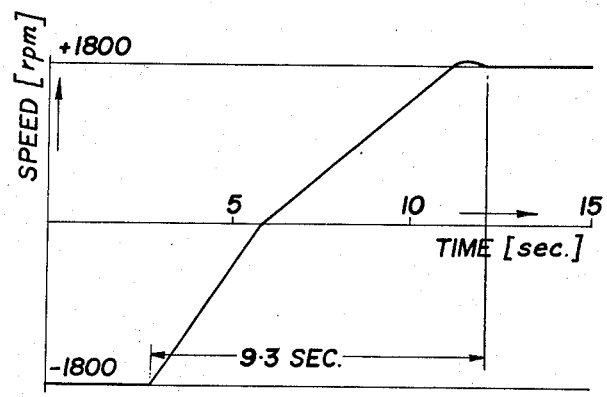
FIGURE 18 shows a typical measured response-time graph for such a system.

FIGURE 18 shows the time speed curve obtained in practice with the above system corresponding to the theoretical time speed curve discussed with respect to FIGURE 6.

It will be appreciated that, whereas a system has been discussed with particular reference to obtaining accurately controlled speed, it is contemplated that the control system of the power modulator and rotor network can be used in a wide variety of control situations.

Figure 19:
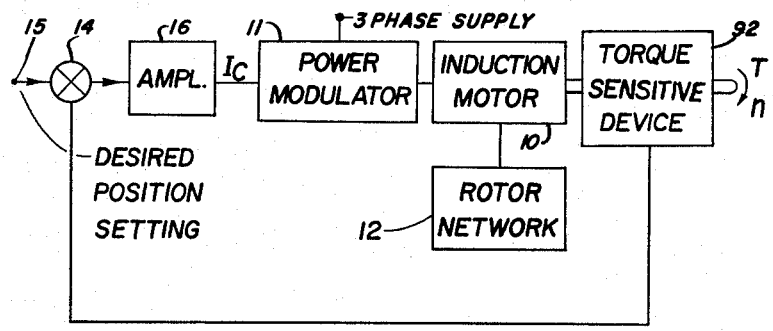
FIGURE 19 shows a block diagram of a closed-loop system of the invention providing for torque control.

FIGURE 19 illustrates a block diagram for a closed-loop circuit, similar to FIGURE 2, in which the tachometer 13 is replaced by a torque sensitive device 92, which may be of any standard construction, supplying a signal proportional to the torque. Similarly, it would be possible to supply an open-loop circuit of the type shown in FIGURE 1 in which the control current supply at 15 was determined by the torque requirements of the load.

Figure 20:
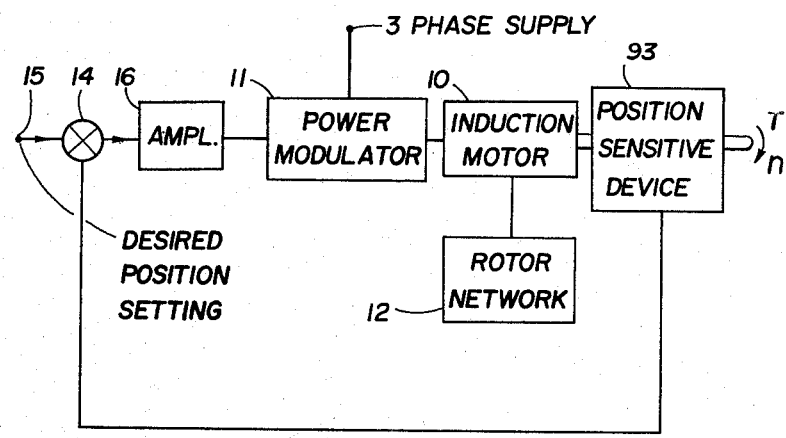
FIGURE 20 shows a block diagram of a position sensitive system in accordance with the invention.

FIGURE 20 illustrates a further use of the system of the invention in which the tachometer 13 or torque sensitive device 92 of FIGURES 2 and 19 are replaced by a position sensitive device 93. In this way the system of the invention may be utilized to give an accurate position control.

Referring to FIGURE 21, the command current source of the invention is illustrated in more detail and comprises the source 92a of command current which may consist of a direct current source or a very low frequency alternating current source. Source 92a is connected in parallel with the voltage potentiometer 93a having a mid point terminal 94 extended by way of line 95 to a terminal 96. A slider 97 being a portion of armature member of the potentiometer 93a is connected by line 98 to terminal 99. Terminals 99 and 96 essentially constitute a portion of the preferred form of comparator indicated by numeral 14 for purposes of continuity with the previous disclosure and in which terminals 100 and 101 are commonly joined by the lead 102. It will thus be apparent that the output terminals 99 and 100 of the comparator, which according to the disclosure of FIGURE 1, effectively would constitute the apparent source 15 of the description herein according to FIGURE 1, present the mere summation of the selected voltage from source 92a and from the signal generator or tachometer 13 of FIGURE 2, the latter being connected to terminals 101 and 96. Concerning the summation of the source voltage and the signal generator shaft state signal, it is desired particularly to point out that the control signal must be connected to terminals 101 and 96 in reverse polarity so that the sum of the voltages will represent a subtraction of the shaft state signal from the signal generator from the command source potential. It will thus be evident that the voltage available at terminals 99 and 100 will be a difference voltage of the two inputs. This difference voltage represents and is a direct function of the difference between the actual speed of the motor as represented by the tachometer voltage and the desired speed of the motor as represented by the voltage from command voltage source 92a.

In FIGURE 22 is disclosed by way of completeness a preferred and simple form of signal generator responsive to shaft speed of the motor and comprising an elementary form of direct current generator 102 driven by the shaft 103 of any induction type motor 10 which may be controlled according to the invention with reference to the previous drawings. The output of the direct current generator connected by way of lines 104, 105 communicates to terminals 101 and 96 of FIGURE 21 effecting the operation before described with reference to that figure.

A suitable form of torque responsive shaft state signal means is disclosed in FIGURE 23 and comprises an electrical voltage source 106 connected across potentiometer 107, the latter being fixed rigidly at a predetermined point as indicated at 108 to the rotating motor shaft (not shown). At another point along the shaft indicated by numeral 109 axially spaced a distance X from point 108 the potentiometer armature 110 is rigidly fixed whereby twist of the shaft over the axial distance X will be represented by the voltage output at terminals 111 and 112 to develop signal $S_{ss}$ the amplitude of which is a function of the angle of twist and hence the torque.

Another type of shaft state signal developing means for generating a signal the amplitude of which is responsive to acceleration of a rotating shaft is shown in FIGURE 24. In this case the source of voltage 113 is connected across the potentiometer resistance 114, the latter being rigidly connected at point 115 to the rotating shaft. The potentiometer armature 116 having associated therewith the mass 117 is freely movable against the biasing force of spring 118 anchored to the rotating shaft at point 119. The terminals 120 and 121 therefore provide an output signal $S_{ss}$ which is a function of acceleration of the shaft effecting motion of the armature 116 relative to the stationary portions of the potentiometer 114 due to the inertia of the mass 117 having regard to the effect of the biasing spring 118.

Another kind of shaft state signal may be obtained from the shaft position responsive means illustrated in FIGURE 25 wherein the potentiometer resistance 122 is disposed about the rotating shaft 123 but remains stationary being served by voltage supply source 124. The potentiometer armature or slider 125 rigidly connected to shaft 123 rotates therewith. In one position of shaft 123 in its 360° of rotation may thus be defined by the voltage available from the armature and indicated as electrically connected by chain lines 126 to terminal 127. The other terminal 128 for signal $S_{ss}$ is connected to a comparison signal generator 129 which may for convenience comprise a similar mechanism in which the potentiometer armature 130 connects to terminal 128. The associated resistance 131 of the potentiometer connects by lines 132 and 133 to voltage source 124. Shaft 134 and rigidly mounted armature 130 is rotated at a selected constant speed by the drive device 135. Accordingly the signal $S_{ss}$ will be a lag or lead signal relative to the desired shaft position determined by the comparison signal generator 129. In addition, however, one may obtain the ratio position at any moment of shaft 123 by closing switch 136 whereby the signal $S_{ss}$ will be of saw tooth form. Obviously a saw tooth type generator of compatible wave form may be used in the form of comparison signal generator indicated.

In FIGURE 26 is disclosed the combining of various shaft state signal means, thus 137, 138 and 139 representing respectively signal generating means for speed, torque and acceleration signals from the devices disclosed may be fed to a signal mixer 140 which may be in the form of a simple adder or electrical junction for the three signals whereby a combined output signal may be taken from the output line 141 to provide a feedback shaft state signal $S_{ss}$ responsive to characteristics of speed, torque and acceleration. In addition, the lag or lead of shaft position may be added to the characteristics of the shaft state signal.

It will be apparent to skilled persons that the simplest forms of comparator and signal generator have been disclosed in FIGURES 21 and 22 in order to facilitate a ready appreciation of the functional aspects of the invention. Complex refinements will be apparent to persons familiar with the utilization of such devices having regard to the characteristics of the power modulator and the specific control source utilized as well as the refinement of control desired in relation to speed and regulation. With the elementary and preferred concepts disclosed herein one may accomplish all of the objects set forth and realize the utility described herein. As an example of equivalence it should be appreciated that the comparator may take the form of a direct current generator having a supplementary field winding in which the field windings represent the two input control voltages and the voltage obtained from the rotor brushes represents the difference voltage of the two inputs. This would however be a non-static form of device and accordingly it would be preferred according to this invention that a static form of comparator of the push-pull amplifier type may be used.

While it would be appreciated that the disclosure herein represents a preferred teaching in sufficient detail to enable practice of the invention and realize the utility and objects thereof it will be understood that departures may be made from the specific disclosure submitted by way of example without departing from the spirit and scope of the inherent combination taught herein and expressed in the following claims.

What we claim is:

1. An infinite speed ratio stationary control system for an induction type motor and utilizing a command electrical source signal and a polyphase power source, said system comprising in combination: a static power modulator in the form of a frequency multiplying transformer having saturable core means and including control current windings, polyphase power input windings energized by said power source and output windings, said output windings being connected to the motor to be controlled; means generating a shaft state signal responsive to at least one state of the shaft of the motor to be controlled; a comparator having a comparator output signal defined by a function of at least two input signals; means communicating said comparator output signal to said control windings; and means communicating the command source and the shaft state signal to said comparator as input signals therefor to effect regulation of the shaft state of said motor by controlled saturation of said transformer core.

2. An infinite speed ratio stationary control system for an induction type motor and utilizing a command electrical source signal and a polyphase power source, said system comprising in combination: a static power modulator in the form of a frequency multiplying transformer having saturable core means and including control current windings, polyphase power input windings energized by said power source and output windings, said output windings being connected to the motor to be controlled; means generating at least one shaft state signal responsive to at least one state of the shaft of the motor to be controlled; comparator means providing a comparator output signal responsive to said command signal and said one shaft state signal; and means communicating said comparator output signal from said comparator means to said control windings to effect controlled saturation of said core means.

3. An infinite speed ratio stationary control system for an induction type motor and utilizing a command electrical source signal and a polyphase power source, said system comprising in combination: a static power modulator in the form of a frequency multiplying transformer having saturable core means and including control current windings, polyphase power input windings energized by said power source and output windings, said output windings being connected to the motor to be controlled; means generating at least two discrete shaft state signals responsive to different shaft states of the shaft of the motor to be controlled; voltage adding comparator devices combining said command source signal and said shaft state signals to provide a control signal; and means communicating said control signal from said comparator devices to said control windings to control the shaft state of said motor by controlled saturation of said core means.

4. An infinite speed ratio stationary control system for an induction type motor and utilizing a command electrical source signal and a polyphase power source, said system comprising in combination: a static power modulator in the form of a frequency multiplying transformer having saturable core means and including control current windings, polyphase power input windings energized by said power source and output windings, said output windings being connected to the motor to be controlled; means generating at least one shaft state signal responsive to at least one state of the shaft of the motor to be controlled; comparator means providing a comparator output signal responsive to said command signal and said one shaft state signal; means communicating said comparator output signal from said comparator means to said control windings to effect controlled saturation of said core means; and means controlling the voltage of said command signal between zero and a maximum, thereby to control the speed of said motor.

5. An infinite speed ratio stationary control system for an induction type motor and utilizing a command electrical source signal and a polyphase power source, said system comprising in combination: a static power modulator in the form of a frequency multiplying transformer having saturable core means and including control current windings, polyphase power input windings energized by said power source and output windings said output windings being connected to the motor to be controlled; means generating at least one shaft state signal responsive to at least one state of the shaft of the motor to be controlled; comparator means providing a comparator output signal responsive to said command signal and said one shaft state signal; means communicating said comparator output signal from said comparator means to said control windings to effect controlled saturation of said core means; a voltage dividing network associated with said command signal source; and means for selecting a command signal from said source network, between maximum voltage values on either side of an intermediate value, to provide a smooth stepless selection of speed control between maximum forward speed and maximum reverse speed.

6. An infinite speed ratio stationary control system for an induction type motor and utilizing a command electrical source signal and a polyphase power source, said system comprising in combination: a static power modulator in the form of a frequency multiplying transformer having saturable core means and including control current windings, polyphase power input windings energized by said power source and output windings, said output windings being connected to the motor to be controlled; means generating a shaft state signal responsive to at least one state of the shaft of the motor to be controlled; a comparator having a comparator output signal defined by a function of at least two input signals; means communicating said comparator output signal to said control windings; means communicating the command source and the shaft state signal to said comparator as input signals therefor to effect regulation of the shaft state of said motor by controlled saturation of said transformer core; a voltage dividing network associated with said command signal source; and means for selecting a command signal from said source network, between maximum voltage values on either side of an intermediate value, to provide a smooth stepless selection of speed control between maximum forward speed and maximum reverse speed.

7. An infinite speed ratio stationary control system for an induction type motor and utilizing a command electrical source signal and a polyphase power source, said system comprising in combination: a static power modulator in the form of a frequency multiplying transformer having saturable core means and including control current windings, polyphase power input windings energized by said power source and output windings, said output windings being connected to the motor to be controlled; means energizing said control current windings responsive to said command source signal; a voltage dividing network associated with said command signal source; and means for selecting a command signal from said source network, between maximum voltage values on either side of an intermediate value, to provide a smooth stepless selection of speed control between maximum forward speed and maximum reverse speed.

8. The system claimed in claim 2 in which the motor is of the induction type having a rotor winding and a network for each phase of the rotor winding in the form of a linear inductor of the non-saturable type and a linear resistance in series therewith to define the first branch of the network, and a second network branch in parallel therewith in the form of a linear resistance, thus to control the form of the torque speed curve of the motor.

9. A control system for polyphase alternating current electric motor and connectable to a polyphase source of electrical power and comprising in combination: a power modulator connecting power from the power source to the motor which constitutes frequency multipliers having saturable cores with power input windings, power output windings and control current windings for affecting the state of saturation of the cores, said power input windings being joined to one another for connection to a polyphase source and said power output windings being joined to one another with polyphase output terminals for connection to said motor; a control current source connected to said control current windings for controlling saturation of said cores, thereby to control the power supplied to said motor; and means reversing the phase sequence of the output of said power modulator upon reversal of the direction of said control current, thereby to effect a reversal of the direction of torque in the motor.

10. A control system in accordance with claim 9 which has a rotor circuit network for the motor comprising a first branch with an inductor and resistance in series and a second branch with a resistance in parallel to the first branch.

11. A control system in accordance with claim 9 in which the control current windings for the cores of said frequency multipliers are connected in two groups, and said means reversing the phase sequence of the output of said power modulator comprises a rectifier interposed between said control current source and one group of said control windings to maintain control current in such group in the same direction upon a reversal of control current at the control current source.

References Cited in the file of this patent
UNITED STATES PATENTS

| | | |
|---|---|---|
| 2,576,529 | McKenney et al. | Nov. 27, 1951 |
| 2,849,674 | Biringer | Aug. 26, 1958 |
| 2,958,814 | Foote | Nov. 1, 1960 |